(12) United States Patent
Nikolic et al.

(10) Patent No.: US 6,483,219 B2
(45) Date of Patent: Nov. 19, 2002

(54) ELECTRIC MOTOR

(75) Inventors: Nikola Tomislav Vicente Nikolic, New Territories (HK); Anthony Charles Colston-Curtis, New Territories (HK)

(73) Assignee: Damco Limited, Wanghal (HK)

( * ) Notice: Subject to any disclaimer, the term of this patent is extended or adjusted under 35 U.S.C. 154(b) by 37 days.

(21) Appl. No.: 09/811,788

(22) Filed: Mar. 20, 2001

(65) Prior Publication Data

US 2002/0135256 A1 Sep. 26, 2002

(51) Int. Cl.[7] .............................................. H02K 31/00
(52) U.S. Cl. ...................... 310/178; 310/254; 310/216; 310/67 R
(58) Field of Search ............................... 310/178, 67 R, 310/68 R, 71, 184, 216, 254, 259, 261, DIG. 6, 266

(56) References Cited

U.S. PATENT DOCUMENTS

| | | | | |
|---|---|---|---|---|
| 4,665,331 A | * | 5/1987 | Sudo et al. | 310/68 R |
| 5,012,571 A | * | 5/1991 | Fujita et al. | 29/598 |
| 5,268,602 A | * | 12/1993 | Schwaller | 310/67 A |
| 5,955,813 A | * | 9/1999 | Bolte et al. | 310/254 |

* cited by examiner

Primary Examiner—Tran Nguyen
Assistant Examiner—Thanh Lam
(74) Attorney, Agent, or Firm—Leydig, Voit & Mayer, Ltd.

(57) ABSTRACT

A DC machine for use as a DC motor (10) or generator, comprising an outer casing (100), and a rotor (200) comprising a central shaft (220) and at least one cylindrical permanent magnet (230) which has a central axis coincident with the shaft (220) and is supported for rotation about its axis within the casing (100). The magnet (230) provides a unipolar radial magnetic field. An annular gap (218) is formed within the rotor (200), which extends co-axially with the magnet (230) such that the magnetic flux of the radial magnetic field extends at substantially right angles across opposite sides of the gap (218). The motor (10) includes a cylindrical stator (300) located co-axially within the gap (218). The stator (300) comprises an armature in the form of a hollow cylindrical roll (310) of elongate insulating substrate (320) having one surface bearing a conductive pattern (330). The pattern (330) has two ends for connection to a DC power source and includes a multiplicity of straight conductors (334). The conductors (334) extend axially with respect to the roll (310) and are interconnected such that a DC current can flow along the conductors (334) in the same axial direction for intersection with the magnetic flux of the radial magnetic field to cause rotation of the rotor (200).

18 Claims, 4 Drawing Sheets

ELECTRIC MOTOR

The present invention relates to a direct current or DC machine and, particularly but not exclusively, to a DC motor.

DC machines may be used both as a motor (for producing movement) and as a generator (for generating power). Although the machine is hereinafter described with particular reference to its use as a DC motor, this is not intended to be a limitation of the invention, i.e. the machine may alternatively be used as a DC generator.

BACKGROUND OF THE INVENTION

There are two well-known types of DC electric motors. In the first type, an electrical power source is connected by means of contact brushes to coils (windings) on an armature which is arranged to rotate about, or within, a stator in the form of one or more permanent magnets, or separately excited field magnets. The rotation of the armature relative to the brushes via a commutator also serves to switch electrical current between the coils. In the second type, the rotor comprises a plurality of permanent magnets, and the stator comprises coils and associated electrical circuitry which controls the switching of electrical power between the coils.

Such designs, being heteropolar devices, require the polarity of the electromagnets as formed by the coils, whether stationary or rotating, to be reversed as the motor turns.

It is an object of the subject invention to provide a DC machine in the form of a DC motor which operates without the "cogging" effect commonly known to commutated DC motors.

It is another object of the subject invention to provide a DC machine in the form of a DC motor which operates without the eddy current losses commonly known to commutated DC motors.

It is a further object of the subject invention to provide a DC machine in the form of a DC motor which operates without the hysterisis losses commonly known to commutated DC motors.

It is a further object of the subject invention to provide a DC machine in the form of a DC motor which has only one air gap, instead of the two air gaps commonly known to commutated heteropolar DC motors.

It is a further object of the subject invention to provide a DC machine in the form of a DC motor which includes only a small number of separate components which may be manufactured and assembled by techniques adapted to industrial-scale manufacture, thereby resulting in a machine which within the scope of manufacturing tolerances exhibits high performance at the lowest possible production cost.

The invention seeks to provide a DC machine and in particular a DC motor having an unprecedented construction.

SUMMARY OF THE INVENTION

According to the invention, there is provided a DC machine for use as a DC motor or generator, comprising an outer casing, and a rotor comprising a central shaft and at least one cylindrical permanent magnet which has a central axis coincident with the shaft and is supported for rotation about its axis within the casing. The magnet provides a unipolar radial magnetic field. An annular gap is formed within the rotor, which extends co-axially with the magnet such that the magnetic flux of the radial magnetic field extends at substantially right angles across opposite sides of the gap. The machine includes a cylindrical stator located co-axially within the gap. The stator comprises an armature in the form of a hollow cylindrical roll of elongate insulating substrate having one surface bearing a conductive pattern. The pattern has two ends for connection to a DC power source and includes a multiplicity of straight conductors. The conductors extend axially with respect to the roll and are interconnected such that a DC current can flow along the conductors in the same axial direction for intersection with the magnetic flux of the radial magnetic field to cause rotation of the rotor.

Preferably, the rotor includes a ferromagnetic core through which the shaft extends, and the magnet is located by the core on one side of the gap.

More preferably, the core comprises a tubular central portion, a cylindrical sleeve surrounding the central portion in a concentric manner, and a circular connecting portion integrally interconnecting adjacent ends of the central portion and sleeve, said central portion and sleeve defining a cylindrical gap between them including the annular gap.

Further more preferably, the core includes an annular ball race which is located co-axially between the central portion and the sleeve adjacent the connecting portion and supports an inner end of the stator.

In a preferred embodiment, the rotor includes a ferromagnetic core through which the shaft extends, and two said magnets are located by the core, one co-axially inside the other and forming the gap therebetween.

In a specific construction, the magnet is formed by a plurality of magnet segments arranged in a circle.

It is preferred that the substrate is laminated, on said surface, with a layer of conductive material having parts thereof removed to form the conductive pattern.

In a preferred embodiment, the straight conductors are connected in parallel in the conductive pattern.

More preferably, the straight conductors are divided in sequential groups which are connected in series, within each group the straight conductors are connected in parallel.

Further more preferably, the number of straight conductors in each group is the same as the other groups.

It is preferred that the parts of the substrate over which the groups of straight conductors lie are impregnated with a particulate ferromagnetic material.

It is preferred that the groups of straight conductors in each layer, while the substrate is rolled up, are arranged to be substantially aligned with the groups in an adjacent layer.

It is preferred that the conductive pattern includes a segment connecting each group of straight conductors to an adjacent group, said segment being inclined at an acute angle to the straight conductors.

More preferably, the acute angle is substantially 45°.

It is an advantage that the total cross-sectional area of the straight conductors in each group is substantially the same as the cross-sectional area of each segment.

Preferably, the segments in each layer, while the substrate is rolled up, are arranged to be substantially aligned with the segments in an adjacent layer, and the aligned segments are shielded by a magnetic field shading material Preferably, the groups of straight conductors and the alternating segments together resemble a waveform.

More preferably, the groups of straight conductors are arranged at gradually changing distance apart from one end of the substrate to the other end, such that when the substrate is rolled up from said one end the groups in each layer are substantially aligned with the groups in an adjacent layer.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
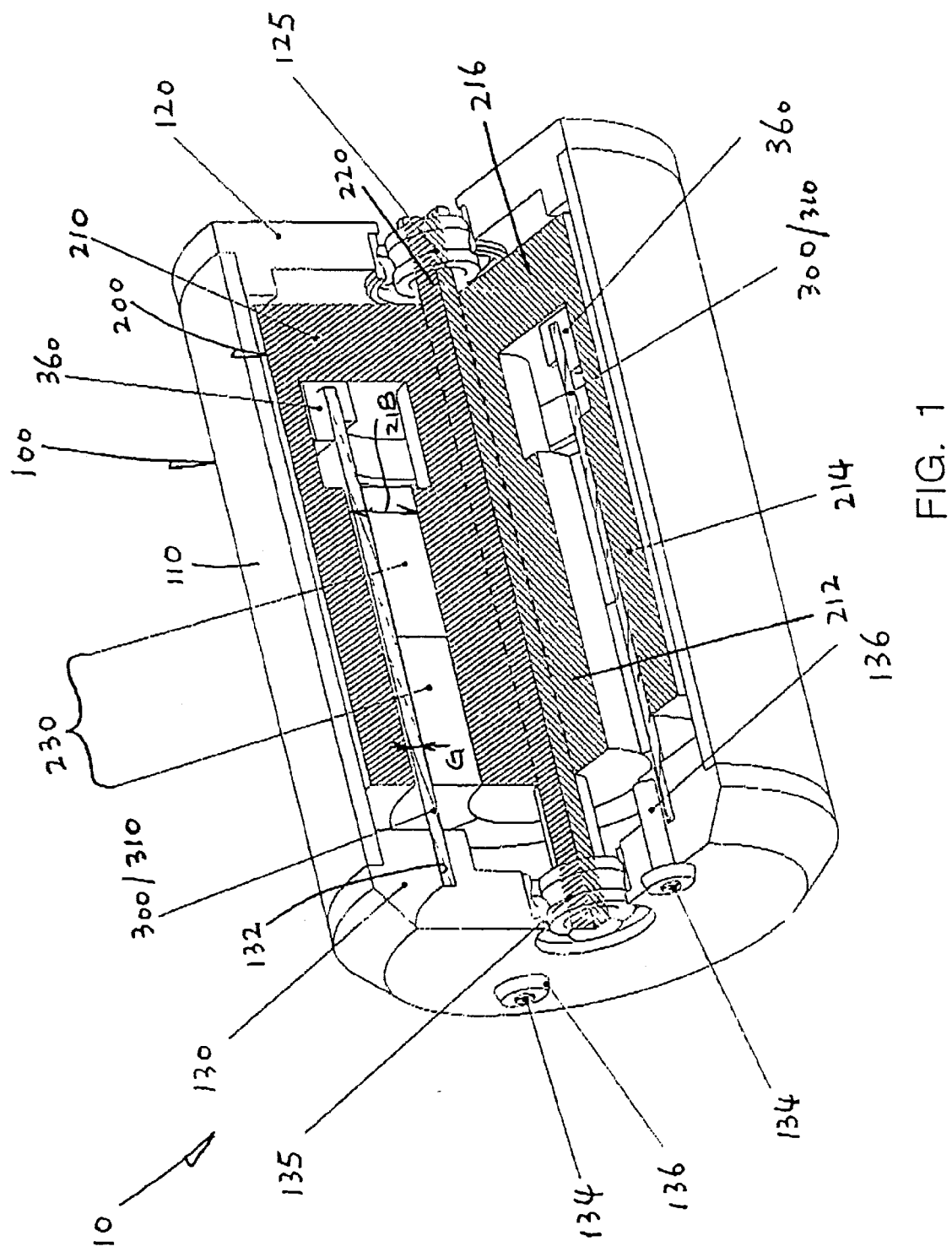
FIG. 1 is a partially cut perspective view of an embodiment of a DC machine, in the form of a DC motor, in accordance with the invention, showing its various parts including a stator.
Figure 2:
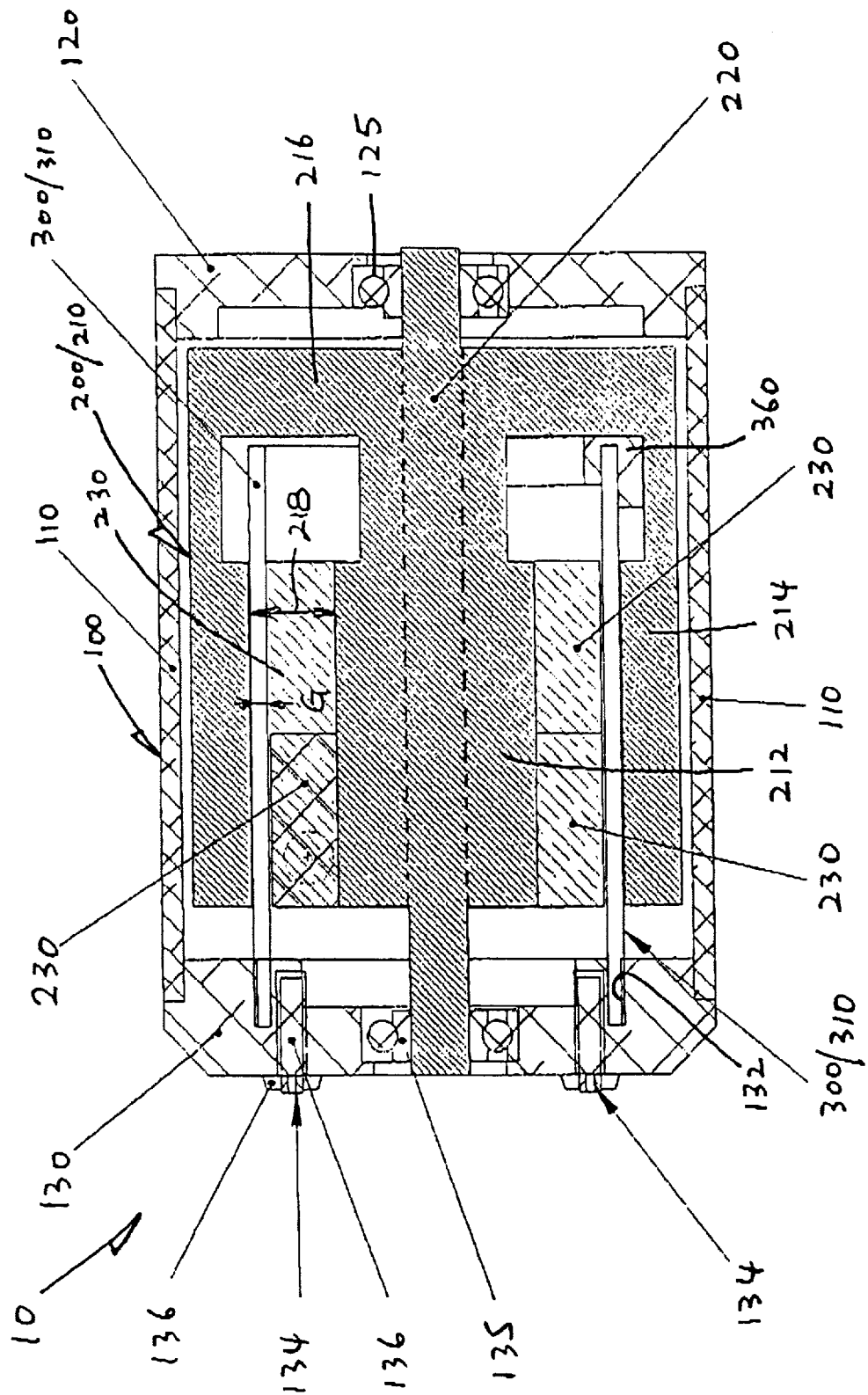
FIG. 2 is a cross-sectional side view of the DC motor of FIG. 1.
Figure 3:
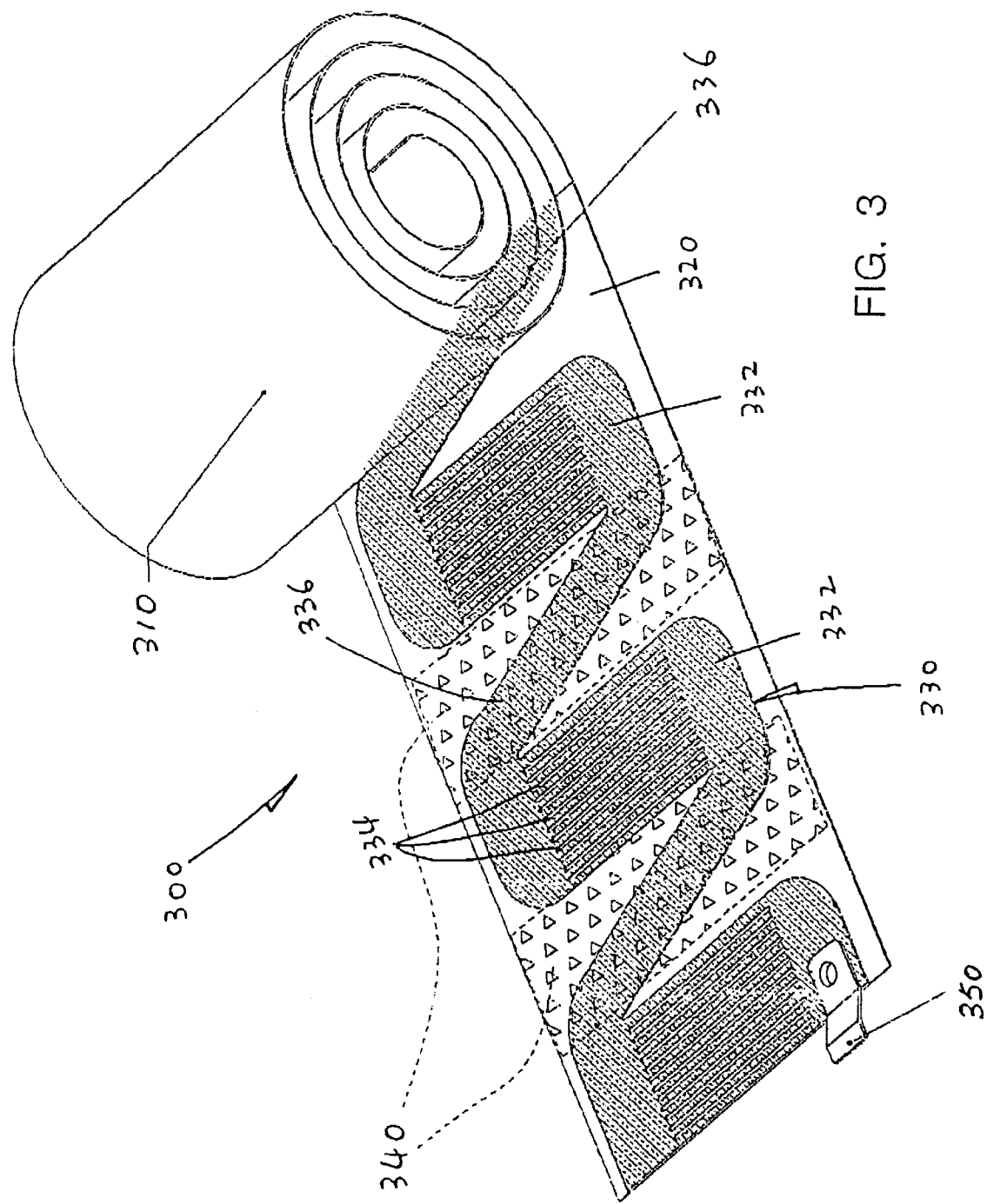
FIG. 3 is a perspective view of the stator of FIG. 1, showing how it is formed as a roll.

Referring to the drawings, there is shown a DC machine in the form of a DC motor 10 embodying the invention, which motor 10 has a cylindrical outer casing 100 and includes, co-axially within the casing 100, a cylindrical rotor 200 and a sleeve-like or tubular stator 300. The casing 100 is formed by an open-ended cylinder 110 and front and rear end caps 120 and 130 closing opposite ends of the cylinder 110. The end caps 120 and 130 are provided with respective central ball bearings 125 and 135.

The rotor 200 comprises a cylindrical ferromagnetic core 210, a motor shaft 220 extending centrally through the core 210, and a cylindrical permanent magnet 230 mounted within the core 210. The shaft 220 is journalled through the front and rear bearings 125 and 135 at opposite ends for supporting the core 210 for rotation. The rotor core 210 is integrally formed by a central tube 212, a cylindrical sleeve 224 surrounding the tube 212 in a concentric manner, and a circular disc 216 interconnecting the tube 212 and sleeve 214 at their ends adjacent the front end cap 120. An annular cylindrical gap 218 is therefore formed co-axially within the rotor core 210 as shown, in which the magnet 230 is situated.

The permanent magnet 230 may take the form of a single cylinder or a number of segments arranged to form a cylinder. In the described embodiment, twelve magnets are employed, each having an angular span of 60°, which form two complete cylinders of equal diameter and mounted endwise adjacent each other. Ideally, two such cylindrical magnets of different diameters should be used, one placed co-axially inside the other to form an annular gap therebetween in which the tubular stator 300 is placed.

In the described embodiment, the permanent magnet 230 is attached on and around the outer surface of the central tube 212 of the rotor core 210, occupying most of the width of the annular gap 218 as shown. A small gap G is left inside the rotor core 210, as between the outer surface of the tube 212 and the inner surface of the sleeve 214, for accommodating the tubular stator 300. Alternatively, the magnet 230 may be mounted on the opposite, inner surface of the sleeve 214.

The hollow cylindrical permanent magnet 230 provides a radial unipolar magnetic field with respect to its axis such that the magnet flux extends in the same radial direction at right angles across the small gap G, with the outer surface of the magnet 230 being the south pole and the inner surface being the north pole. Upon rotation of the rotor core 210, the magnetic field becomes a unipolar rotating field.

The rotor core 210 provides a return path for magnet flux, thereby completing the magnetic circuit. It may be made of mild steel, a polymer impregnated with ferromagnetic particles that can be power injection moulded, or any other suitable ferromagnetic material.

The stator 300 serves as an armature which is implemented by a hollow cylindrical roll (scroll) 310 of elongate insulating substrate 320 having one surface bearing a conductive pattern or track 330, rolled up to form a single stator coil. The stator 300 resembles an open-ended cup having a relatively thin-walled section. The substrate 320 is made from a strip of film of suitable insulating material, such as paper or, in this particular embodiment, a high temperature polymer such as KAPTON (polyimide). The KAPTON film 320 has excellent mechanical properties, including high modulus of elongation, extremely high modulus of elasticity, and very low and very high working temperatures (several hundred degrees centigrade).

The track 330 is made from a length of thin conductive material such as copper (for higher conductivity) or aluminium (for lower cost and mass) The track 330 takes the form of a square wave having a wavelength gradually increasing along the length of the substrate 320. The waveform on each layer of the roll 310 overlaps or is aligned with the same phase of the waveform on the next layer, with the increase in wavelength allowing for the increase in circumference of the roll 310 from an inner turn to an adjacent outer turn.

The KAPTON film 320 comes laminated with a conductive metallic foil of copper or aluminum, onto which particular geometric design is laser machined (cut) or lithographically etched to form the track 330. The design resembles the capital letter "N", repeated sequentially to form a series of N-shaped patterns, varying in length for each consecutive turn. Each vertical portion 332 of the "N" is spliced to form a number of vertical branches 334 connected in parallel, with the diagonal portion 336 of the "N" unspliced. Both portions 332 and 336 of the "N" have the same total cross-sectional area and are therefore equal in electrical resistance. The strip 320 is then rolled up to form a hollow cylinder, with its layers bonded together by means of a suitable high performance adhesive, thereby resulting in a thin-walled cylinder having a high torsional strength. As the electrical resistance is equal throughout all conductive segments of the track 330, and there is only one current path from one end of the track 330 to the other, the overall resistance will be high, as it is similar to connecting a group of resistors in series.

The repeating pattern of the track 330 provides a single path for a DC current to flow along from one end of the substrate sheet 320 to the other, where a pair of terminal contacts 350 are fixed connection to a DC power source. It will be noted that the track 320 comprises a plurality of the branched segments 332, alternating with the unbranched segments 336, with the unbranched segments 336 being inclined at an angle of about 45° to the branched segments 332. The total amount of conductive material employed in each segment 332/336 has the same cross-sectional area, giving the track pattern a uniform electrical resistance throughout its length. The purpose of the branching is to maximise the incidence of field flux cutting in these regions, and thus to maximise the magnetic field linkage between the rotor 200 and the magnet field of the stator 300, and to maximise the generation of magnetic field through the phenomenon known as flux bunching. In the ideal construction, there should be an infinitely large number of infinitesimally narrow branches 334, with the smallest possible gaps between them. In this particular embodiment, each branched segment 332 has 13 branches, each having a width of about 2.5 mm and a gap of about 1.6 mm. The concentration of magnetic density should be appropriate for the field flux.

The substrate sheet 320, which is laminated with the conductive material cut into the repeating pattern 330 as described above, is rolled up to form a cylinder in such a manner that the branched and unbranched segments 332 and 336 of the track 330 are substantially superimposed, branched-upon-branched and unbranched-upon-unbranched, as each turn of the cylindrical roll 310 is made. To this end, the dimensions of the track 330 varies slightly from one end of the sheet 320 to the other, taking in account of the lengthening of each turn of the roll 310 due to the thickness of the laminated sheet 320. In this particular embodiment, the sheet 320 has an overall length of about 11 meters, and is rolled into a cylinder having 25 turns, with an inner diameter of about 102 mm and an outer diameter of about 110 mm.

Once the cylinder 310 is rolled up, a plurality of thin magnetic field shading strips 340, made of high permeability nickel based material or so called mu-metal or permalloy, are placed over the aligned diagonal portions 336 of the N-shaped patterns. The shading strips 340 reduce the incidence of the magnetic flux cutting the shaded regions of the stator coil or winding, which if not shaded would generate a reverse electromotive force. The whole cylinder 310 is then placed in an epoxy resin cast, thereby forming the completed stator 300. Holes may be drilled in unlaminated parts (not covered by the track 330) of the cylinder 310, through which the epoxy resin may flow to further stiffen the structure.

The copper or aluminium foil that forms the conductive track 330 has a thickness of about 100 microns, and the substrate sheet 320 has a thickness of about 50 microns. The principle of the invention holds true for any size of motor or generator. The only limiting factors on the thickness of the substrate sheet 320 are the ability of the sheet 320 to be rolled up, and the requirement that the sheet 320 has a sufficient mechanical strength and a dielectric strength (electrical breakdown resistance). There is no necessity for the substrate 320 to be any thicker than the minimum required to perform its function, namely to provide insulation between the different layers of the conductive track 330, once it is rolled up to form the coil, and also torsional mechanical rigidity. The insulating substrate 320 may be impregnated with particulate ferromagnetic material, such as iron oxide, to maximise electromagnetic flux linkage. The distribution of this impregnation must be selective, namely it must only occur in the parts of the substrate 320 under the branched segments 332 of the conductive track 330, or in other words not at where the unbranched segments 336 lie.

The assembled tubular stator 300 is inserted into the annular gap G between the rotor sleeve 214 and the permanent magnet 230, leaving only a pair of very small air gaps on opposite sides of the wall of the stator 300. The outer (trailing) end of the stator 300 is fixed within an annular groove 132 of the rear end cap 130. A pair of power intake electrodes 134 extend through this end cap 130, which are supported by respective insulating sleeves 136 and are in contact internally with the corresponding terminal contacts 350 of the rolled up conductive track 330 of the stator 300 (the stator coil). The inner (forward) end of the stator 300 is supported by an annular ball race 360 mounted within that end of the rotor core 210, such that the rotor 200 is free to rotate relative to the stator 300.

Upon the connection of a DC power source to the electrodes 134, a DC current flows through the stator coil along the rolled up track 330 in a single direction that is substantially parallel to the axial direction of the stator 300 and rotor 200. The DC current flowing through the branched segments 332 produces a magnetic field that intersects with the radial flux of the unipolar magnetic field provided by the magnet 230 of the rotor 200, whereby the rotor 200 is caused to spin according to Lenz's law.

Lenz's law and, in particular, Fleming's right-hand rule states that if a current is passed through a length of conductive material in direction x, cutting the flux of a magnetic field in direction y, then an electromotive force will be created in direction z. If the magnetic field is radial, as in this present case, then continuous rotational torque will be created.

The basic function of the stator 300 described above is to provide a stator coil (formed by the rolled up track 330) through which a DC current can flow—effectively along the branches 334 in the branched segments 332 of the stator coil—to create a substantially unidirectional electromagnetic field that interacts with a unipolar magnet field provided by the rotor 200, thereby producing a constant torque to set the rotor 200 into rotation. It is obviously desirable that the production of counter electromotive force in the stator 300 in the opposite direction, through the unbranched segments 336, be minimised. This is effected, to a certain extent, by the topology of the repeating pattern of the track 330. The fact that the segments 336 are unbranched greatly reduces the concentration of magnetic flux in these segments 336, compared with the branched segments 332. Also, the fact that the unbranched segments 336 cut the radial magnetic flux at an angle that may be 45° to the branched segments 332 also reduces the production of the undesired counter electromotive force.

Figure 4:
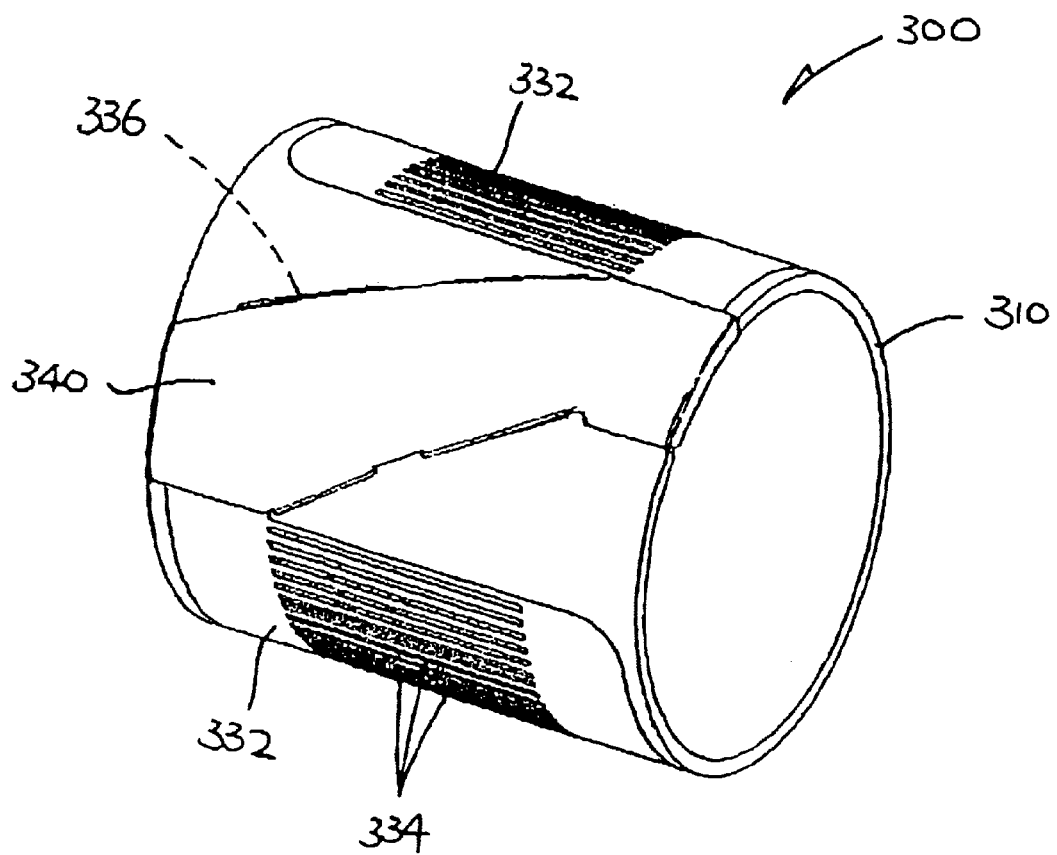
FIG. 4 is a perspective view of the stator of FIG. 3, in the finished form.

To further reduce the production of counter electromotive force, the magnetic field shading strips 340, formed from a high permeability nickel-based alloy (mu-metal), are attached onto (the outer side of) the stator 300 and cover the unbranched segments 336 (as best shown in FIG. 4) This has the effect of redirecting the magnetic flux away from these segments 336. The shading strips 340 substantially coincide with and cover or shield the unbranched segments 335 and provide a low reluctance path for the stator magnetic field to follow. It is a magnetic circuit that is fixed stationary to the motor end cap 130.

The subject motor 10 does not need electromagnet polarity reversal. Instead the winding (of the stator 300) has a continuous fixed polarity, and as such, produces rotational torque within a unipolar rotating magnetic field (of the rotor 200).

The subject invention has a number of advantages over brushed and brushless commutated DC motors. Firstly, the subject motor 10 operates without the "cogging" associated with heteropolar motors. This effect is caused by the gaps between the permanent or excited field magnets in standard DC motors. As the magnetic field generated by the motor 10 is continuous and circular, and therefore has a uniform flux density and a constant air gap length, there is no "cogging". This has implications in such areas as robotics, as in a design without "cogging", there are no unwanted vibrations imparted on the motor.

Eddy current losses are a power loss mechanism, and are caused by rapidly changing alternating currents in the field magnets (excited field) or armature windings. These generate small electromotive forces which do several undesirable things, including a counteracting magnetic field impeding rotation and rapid heating via joule heating of the ferromagnetic core or stator. Because in the subject invention, the supply current is DC, and is therefore unchanging with respect to time, the motor 10 is simply unable to generate such power-wasting eddy currents. Hysterisis losses, like eddy current losses, arise from the changing nature of the supply current, and are absent in the subject invention for the same reason.

As part of the magnetic circuit in a motor, the air gap plays a crucial role. The air gap has the highest reluctance path in the magnetic circuit. It would be advantageous to have the air gap as short as possible. In addition to this, it would be advantageous to have as few air gaps as possible, i.e. one only. Since the subject motor 10 has only one air gap, tremendous saving in magnetic energy power loss can be made.

A further advantage presents itself if the subject DC machine is used as a generator instead of as a motor. Conventional commutated DC generators produce raw unregulated DC that has varying amplitude. This pulsating DC is commonly fed through a series of filter capacitors to smooth out and regulate its amplitude. When used as a DC generator, the subject invention produces DC current of continuous amplitude, thereby avoiding the use of filtering capacitors.

The subject DC machine has an increased life span due to the absence of brushes and commutator, the elimination of hysterisis and eddy current losses, and the minimisation of rotational losses, such as windage. The "cogging" effect, associated with heteropolar motors, is absent. Efficiency is maximised, as there is only one air gap. Also, the extreme mechanical simplicity of this design makes it very competitive in terms of production cost.

The invention has been given by way of example only, and various other modifications of and/or alterations to the described embodiment may be made by persons skilled in the art without departing from the scope of the invention as specified in the appended claims.

What is claimed is:

1. A DC machine for use as a DC motor or generator, comprising an outer casing, a rotor comprising a central shaft and at least one cylindrical permanent magnet having a central axis coincident with the shaft and supported for rotation about its axis within the casing, said magnet providing a unipolar radial magnetic field, an annular gap formed within the rotor and extending co-axially with the magnet such that the magnetic flux of the radial magnetic field extends at substantially right angles across opposite sides of the gap, and a cylindrical stator located co-axially within the gap, said stator comprising an armature in the form of a hollow cylindrical roll of elongate insulating substrate having one surface bearing a conductive pattern having two ends for connection to a DC power source and including a multiplicity of straight conductors which extend axially with respect to the roll and are interconnected such that a DC current from said power source can flow along the conductors in the same axial direction for intersection with the magnetic flux of the radial magnetic field to cause rotation of the rotor.

2. The DC machine as claimed in claim 1, wherein the rotor includes a ferromagnetic core through which the shaft extends, and the magnet is located by the core on one side of the gap.

3. The DC machine as claimed in claim 2, wherein the core comprises a tubular central portion, a cylindrical sleeve surrounding the central portion in a concentric manner, and a circular connecting portion integrally interconnecting adjacent ends of the central portion and sleeve, said central portion and sleeve defining a cylindrical gap between them including the annular gap.

4. The DC machine as claimed in claim 3, wherein the core includes an annular ball race which is located co-axially between the central portion and the sleeve adjacent the connecting portion and supports an inner end of the stator.

5. The DC machine as claimed in claim 1, wherein the rotor includes a ferromagnetic core through which the shaft extends, and two said magnets are located by the core, one co-axially inside the other and forming the gap therebetween.

6. The DC machine as claimed in claim 1, wherein the magnet is formed by a plurality of magnet segments arranged in a circle.

7. The DC machine as claimed in claim 1, wherein the substrate is laminated, on said surface, with a layer of conductive material having parts thereof removed to form the conductive pattern.

8. The DC machine as claimed in claim 1, wherein the straight conductors are connected in parallel in the conductive pattern.

9. The DC machine as claimed in claim 8, wherein the straight conductors are divided in sequential groups which are connected in series, within each group the straight conductors are connected in parallel.

10. The DC machine as claimed in claim 9, wherein the number of straight conductors in each group is the same as the other groups.

11. The DC machine as claimed in claim 9, wherein the parts of the substrate over which the groups of straight conductors lie are impregnated with a particulate ferromagnetic material.

12. The DC machine as claimed in claim 9, wherein the groups of straight conductors in each layer, while the substrate is rolled up, are arranged to be substantially aligned with the groups in an adjacent layer.

13. The DC machine as claimed in claim 9, wherein the conductive pattern includes a segment connecting each group of straight conductors to an adjacent group, said segment being inclined at an acute angle to the straight conductors.

14. The DC machine as claimed in claim 13, wherein the acute angle is substantially 45°.

15. The DC machine as claimed in claim 13, wherein the total cross-sectional area of the straight conductors in each group is substantially the same as the cross-sectional area of each segment.

16. The DC machine as claimed in claim 13, wherein the segments in each layer, while the substrate is rolled up, are arranged to be substantially aligned with the segments in an adjacent layer, and the aligned segments are shielded by a magnetic field shading material.

17. The DC machine as claimed in claim 13, wherein the groups of straight conductors and the alternating segments together resemble a waveform.

18. The DC machine as claimed in claim 17, wherein the groups of straight conductors are arranged at gradually changing distance apart from one end of the substrate to the other end, such that when the substrate is rolled up from said one end the groups in each layer are substantially aligned with the groups in an adjacent layer.

* * * * *